Dec. 22, 1953  S. C. COLLINS  2,663,167
GAS SEPARATION APPARATUS AND METHOD
Filed Sept. 21, 1951  2 Sheets-Sheet 1

INVENTOR:
SAMUEL C. COLLINS
BY John F. Schmidt
ATTORNEY

Dec. 22, 1953     S. C. COLLINS     2,663,167
GAS SEPARATION APPARATUS AND METHOD
Filed Sept. 21, 1951                                                  2 Sheets-Sheet 2
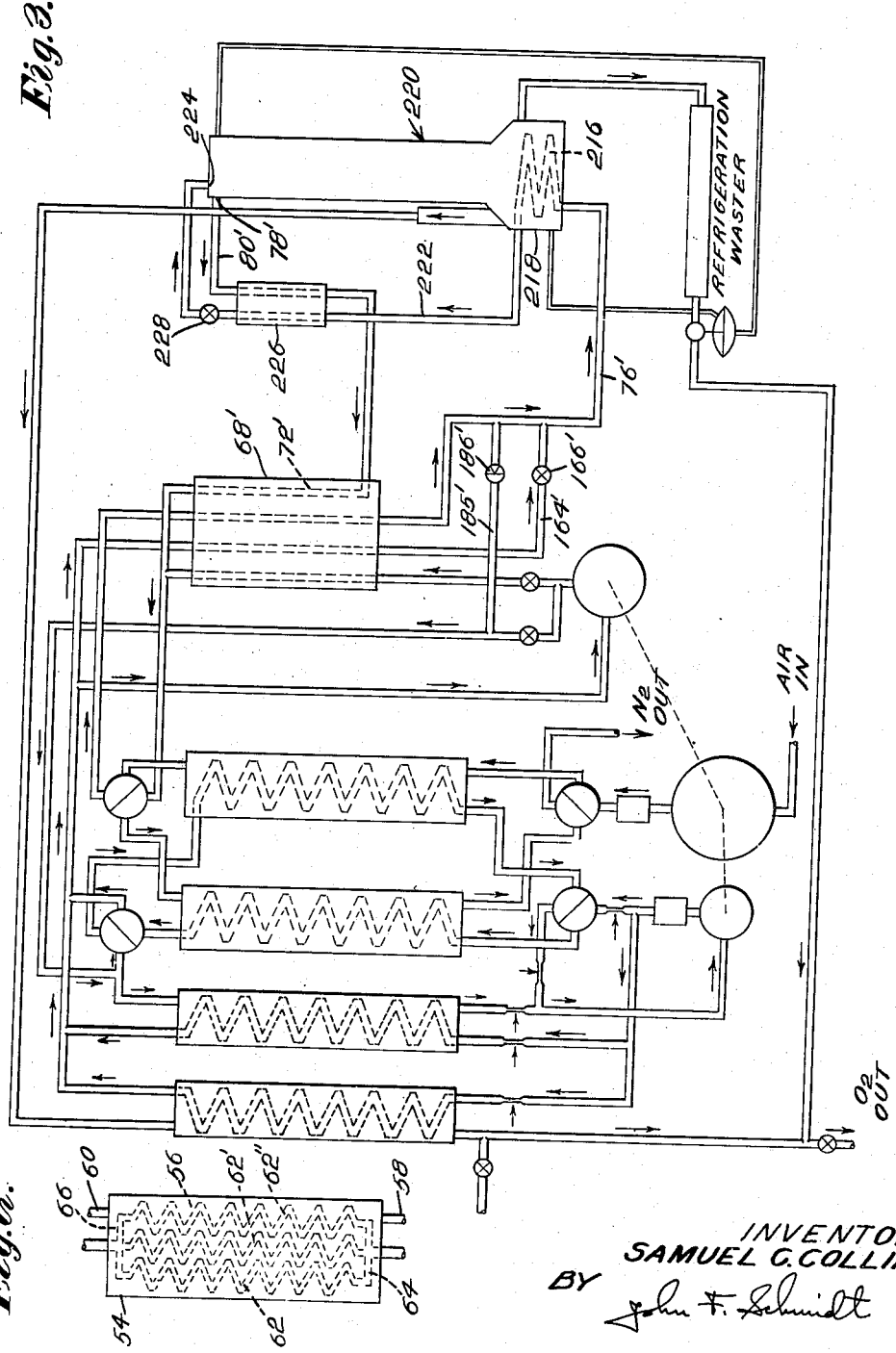
INVENTOR:
SAMUEL C. COLLINS
BY
ATTORNEY Patented Dec. 22, 1953

2,663,167

UNITED STATES PATENT OFFICE 2,663,167

GAS SEPARATION APPARATUS AND METHOD

Samuel C. Collins, Watertown, Mass., assignor to Joy Manufacturing Company, Pittsburgh, Pa., a corporation of Pennsylvania Application September 21, 1951, Serial No. 247,696

21 Claims. (Cl. 62—122)

This invention relates to apparatus for and a method of separating mixed gases, more specifically being a method and apparatus for the separation of air into a substantially pure product and a waste gas effluent, herein oxygen and mostly nitrogen, respectively.

Where the mixed gases to be separated are those which make air or a similar mixture, there always a problem in connection with the removal of impurities, which in the case of air are principally carbon-dioxide and water. Where the separation involves rectification at low temperatures, these impurities must be removed in order to prevent plugging of the apparatus by freezing of the impurities at the low operating temperatures encountered. The impurities may be removed in any of a number of ways, but recent developments tend to move in the direction of condensing the impurities out in reversing heat exchangers, in which raw air flows through a heat exchanger in thermal contact with a cold product of the rectification, depositing the impurities on the surfaces of the passages through which the air flows. Periodically, the air and the cold gas exchange flow passages, whereupon the cold gas removes the impurities by flowing outward through the passage in which air has just been flowing, and the raw air flows through the passage through which the cold gas has just been flowing. Such a heat exchanger is called a reversing heat exchanger, and has substantial advantages over the removal of impurities by chemical means, these advantages being well understood by those skilled in the art.

In spite of the advantages in the use of reversing heat exchangers, substantial problems are present, in that such reversing exchangers have a tendency to accumulate condensed impurities. Continued operation with the heat exchangers in which the impurities are not completely removed eventually results in almost complete plugging of the heat exchanger passages, necessitating shutting down of the apparatus to permit heating of the heat exchangers and the vaporization of the impurities.

There is a type of very efficient and compact heat exchanger which has long been known to the art. This is the Hampson type heat exchanger and has a reputation as an extremely efficient and compact counter-flow heat exchanger. In a heat exchanger of this type, many small bore long tubes, comprising a bundle, are coiled densely within a shell, thus forming a shell-and-tube type of heat exchanger. Most efficient use of a heat exchanger of this type for a high pressure gas, such as high pressure air, and a low pressure gas, such as the returning waste gas effluent from a rectifier, would involve passing the previously purified high pressure air through the tubes, and the low pressure returning gas in the shell space outside the tubes. In general, the low pressure gas would flow at right angles to the tubes through relatively narrow slits between adjacent tubes, but of course variations of this arrangement are possible and workable.

When raw air must be treated in reversing exchangers for purification, the Hampson type is unsatisfactory, principally because the resistance to fluid flow is too great through the too small tubes. This would be true for that half of the complete cycle in which the low pressure gas would have to return through the small tubes. The power lost due to pressure drop is a function of the fractional drop in absolute pressure. The purging gases are always at low pressure and are of relatively great volume. The actual drop in pressure resulting from a given mass rate of flow is proportional to the square of the volume. That fact, together with the small absolute pressure, makes for intolerable power losses in such a reversing exchanger. A possible remedy resides in using a sufficiently large number of small tubes to avoid excessive power losses. However, such a solution would involve the use of such a large number (possibly thousands) of tubes as to make such a possible solution entirely impracticable.

It is accordingly an object of this invention to provide an apparatus and a method for the separation of gaseous mixtures like air containing impurities, in which reversing heat exchangers of the Hampson type can be used in a practical, efficient manner. This and other objects are accomplished in an apparatus in which two substantially identical shell-and-tube Hampson type heat exchangers are provided and are connected in the apparatus by means of suitable reversing valves. The reversing valves and the heat exchanger passages are so connected that the raw air containing the impurities and the purging gas always flows in the shell passages, which of course provide a low resistance to flow.

It would not be necessary from the standpoint of power losses to have the air flow through the shell passages, because the air is at high pressure. However, because the low pressure return gases must flow through passages having a low resistance to flow and must flow through the passages that are used by the air (alternately of course) in order to remove the impurities, the raw air must also flow through the passages having low resistance to flow. In view of this requirement, the ingoing raw air and the leaving low pressure gases are always passed through the shell passages of shell-and-tube type of heat exchangers; while other fluids at high pressure always pass through the tube passages. The high pressure fluid in a given tube passage is alternately a cold fluid and a warm fluid, depending upon whether the tube passage must cool the raw air or extract refrigeration from the leaving low pressure and low temperature product. In addition, means are preferably provided to create a temperature drift in the heat exchanger during that portion of the operating cycle in which impurities are removed by the purging low pressure return gas.

In a preferred form of this invention, this temperature drift is brought about by the provision of means to effect a variation in the flow of warm gas through that one of the reversing heat exchangers which is being purged of impurities. The means referred to involves the use of a variable flow device. More specifically, another heat exchanger has one passage thereof connected in parallel with the tube passage of whichever one of the reversing exchangers is being purged. A variable restriction or orifice is placed in said one passage of the other heat exchanger. By increasing the flow resistance through the two-passage heat exchanger, a substantial overload of warm gas is forced through the tube passage of the reversing exchanger. This has the effect of elevating the temperature throughout the length of the heat exchanger which is being purged. Since the carbon dioxide is deposited on the exposed surfaces of the shell passage, including the outside surfaces of these tubes, its vapor pressure rises as the temperature rises. Inasmuch as a change of as little as five degrees will have a profound effect in facilitating removal of carbon dioxide by the purging fluid, this change is significant.

The overload of warm gas should take place for approximately one-half to three-fifths of the half-cycle during which the heat exchanger is purged. For the remainder of the half-cycle, the variable restriction in the fluid passage of the third heat exchanger is removed, permitting the temperature to fall back again to the temperature at which the heat exchanger operates during the other half-cycle.

In the drawings:

Fig. 2 shows a possible variation of the Hampson type of heat exchangers shown in Fig. 1.

Fig. 3 is a figure similar to Fig. 1, but showing apparatus in which a single rectification column is used in place of the double rectification column shown in Fig. 1.

*The apparatus aspects of the invention*

Figure 1:
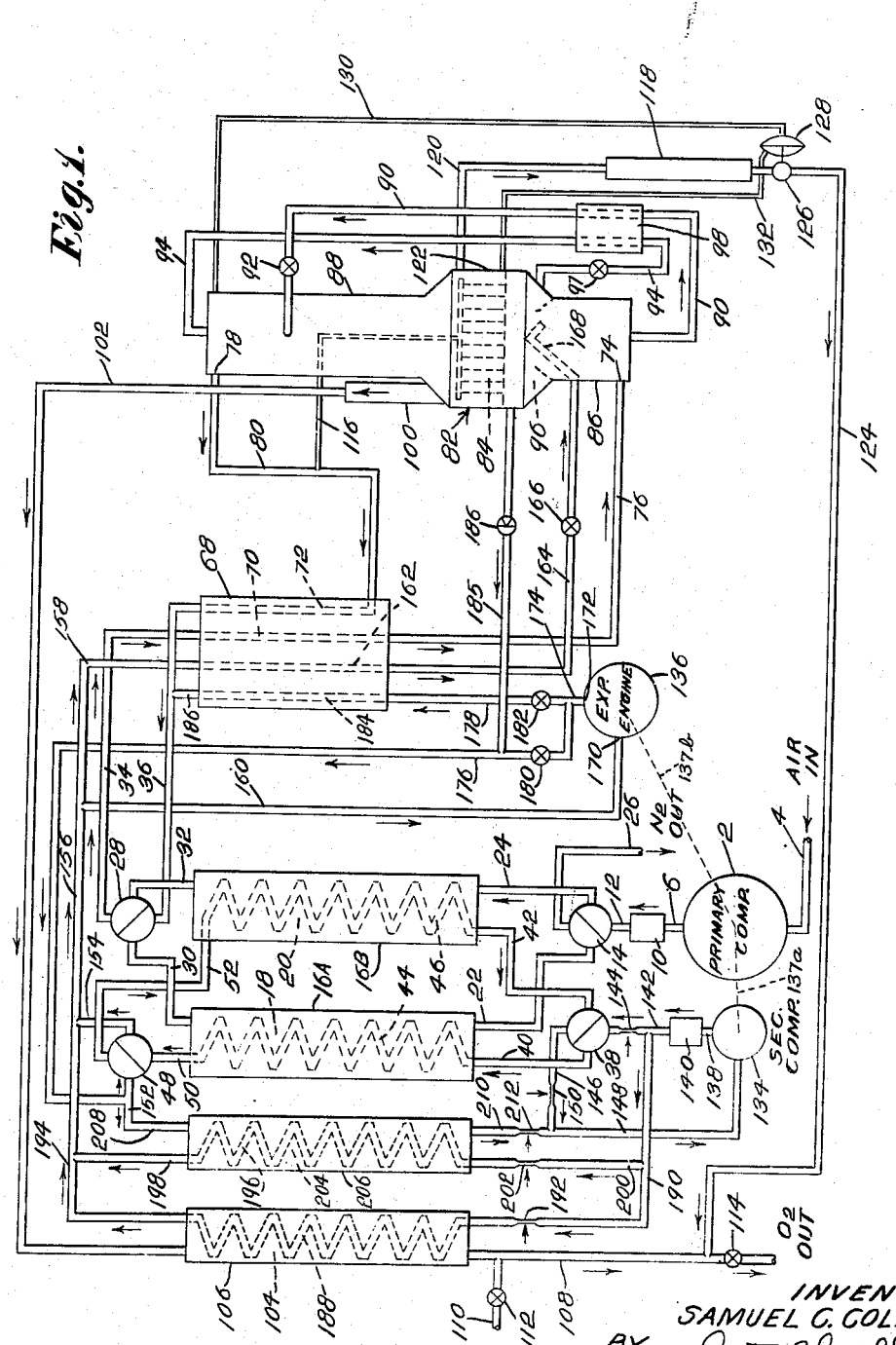
Fig. 1 shows a gas separation apparatus made according to this invention.

Referring now to Fig. 1 for a more specific description and discussion of the apparatus aspects of the invention, I have there shown a source of compressed air 2 which may be any suitable air compressor having an air intake 4 and an air discharge 6. The compressor or source of compressed air preferably discharges through a suitable filter 10 (which is provided for the removal of filterable impurities).

The filter 10 is connected by means of a conduit 12 with a first reversing valve 14. Reversing valve 14 is connected with the reversing heat exchangers 16A and 16B. More specifically, the shell passages 18 and 20 of the reversing heat exchangers 16A and 16B are connected with the reversing valve 14 by means of conduits 22 and 24 respectively. A waste gas discharge 26 completes the conduit connections with the reversing valve 14.

It will of course be understood by those skilled in the art, that the passages in the reversing exchanger 16A and 16B are two-ended passages. Exchangers 16A and 16B are preferably placed with their warm ends down, as shown in the drawings. The warm ends of the reversing exchangers 16A and 16B are connected with the conduits 22 and 24 as aforesaid, and the other ends of the shell passages of the reversing exchangers 16A and 16B are connected with a second reversing valve 28 by means of conduits 30 and 32 respectively. Two other conduits, namely 34 and 36, complete the connections with the reversing valve 28.

A third reversing valve 38 is connected with the reversing exchangers 16A and 16B by way of conduits 40 and 42 respectively. More specifically, the warm ends of the tube passages 44 and 46 are connected with the conduits 40 and 42 respectively. The other or cold ends of the tube passages 44 and 46 are connected with a fourth reversing valve 48 by means of conduits 50 and 52 respectively.

The reversing valves 14, 28, 38 and 48 may all be mechanically actuated, or, if desired, valves 14 and 38 may be mechanically actuated and valves 28 and 48 may be reversing check valves, as shown in my copending patent application Serial No. 161,786, filed May 13, 1950, and assigned to the assignee of this invention.

It will of course be understood by those skilled in the art, that the heat exchangers 16A and 16B are shown schematically in Fig. 1. In this schematic showing, the tube passages 44 and 46 are shown as single tubes. In actual practice, these single tube passages are preferably a great many small tubes all connected with an inlet header and an outlet header. As an example of a multiple-tube passage type of heat exchanger, I have shown, also schematically, in Fig. 2 a shell-and-tube heat exchanger of the Hampson type, in which a two-ended shell passage 56 has its one end connected with a conduit 58 and its other end connected with a conduit 60. The tube passage of the heat exchanger 54 is provided by a plurality, here shown as three, of small passages 62, 62' and 62''. It will of course be understood by those skilled in the art, that any desired number of plural passages 62, 62', etc. to 62$^n$ may be used. The one end of the tube passage is connected with a header 64 and the other end is connected with a header 66.

Returning now to the double column embodiment shown in Fig. 1, the second reversing valve, namely valve 28, is connected with the conduits 34 and 36 as aforesaid, of which conduit 34 is always connected to supply purified compressed air to the column air inlet and the conduit 36 is always connected to receive waste gas effluent from the column waste gas outlet, as will be seen below.

In a preferred embodiment of the invention, as shown here, the entering purified air and the leaving waste gas effluent are in heat exchange relation with each other. To this end, a heat exchanger 68 is provided having a passage 70 connected with the conduit 34, and through which passage 70 entering air therefore passes, and having another passage 72 connected with the conduit 36. Passage 70 of heat exchanger 68 is also connected with the column air inlet 74 by means of a conduit 76. Passage 72 is connected with the column waste gas outlet 78 by means of a conduit 80.

The rectification column shown in Fig. 1 is a conventional double column 82 having the usual air inlet 74 referred to above and a waste gas effluent outlet 78, also referred to above. A conventional boiler-condenser 84 separates the lower column or high pressure section 86 from the upper column or low pressure section 88. A conduit 90 is provided to conduct oxygen-rich liquid air from the lower column section 86 and discharge the liquid by way of expansion valve 92 into the upper column section 88. Similarly, a conduit 94 is connected to conduct nitrogen-rich liquid from the nitrogen shelf 96 and discharge that liquid into the upper column section by way of an expansion valve 97. The two liquids are preferably in heat exchange relation with each other in a heat exchanger 98 which has passages which may properly be considered part of the conduits 90 and 94.

The column is also provided with a product outlet, this being shown in the form of a stack type of outlet, or settling chamber, 100 of any suitable type to insure that only vapor leaves the column by way of the chamber 100 and the conduit 102 connected thereto. The product conduit 102 is connected with the shell passage 104 of a shell-and-tube heat exchanger 106. A product supply conduit 108 is connected to receive warmed product from the passage 104. The product supply conduit 108 has connected thereto another conduit 110 which discharges to atmosphere, conduit 110 having therein a valve 112. The product supply conduit 108 is also provided with a shut-off valve 114.

Returning again to the column 82, it can be seen that the boiler-condenser 84 has a small rare-gas bleed conduit 116 connected with the upper end of the boiler condenser coil and connecting into the waste gas effluent conduit 80.

Apparatus made according to this invention may if desired embody a refrigeration waster 118 which is simply a heat exchanger having a single passage therethrough and being constructed for heat exchange with ambient air. To this end, the refrigeration waster 118 is connected by a conduit 120 with the product collecting pot 122 in the evaporator-condenser section of the column 82. Preferably, the conduit 120 taps into the column at approximately the normal liquid level of the column, the liquid referred to being the product oxygen. Another conduit 124 connects the refrigeration waster with the product supply conduit 108. In the conduit 124, there is provided a valve 126 which is automatically controlled by a diaphragm 128, one side of which is exposed to the pressure at the upper end of the column by means of a pressure conduit 130, and the other side of which is exposed to the pressure in the lower end of the upper column section by means of a pressure conduit 132.

In order to bring the air down to the low temperatures at which rectification must be carried out, some suitable refrigeration source must be provided. This refrigeration source is the major source of refrigeration for the system, although of course some refrigeration is derived from the isenthalpic expansion of air or other fluids through the several expansion valves.

In the embodiment of the invention shown herein, the source of refrigeration is a compressor-expander circuit which utilizes gas having substantially the composition of the vapor above the liquid in the nitrogen shelf.

The refrigeration source includes the compressor shown at 134 and the expander shown at 136. The compressor 134 is a substantially conventional compressor suited to the purpose, and the expander 136 is preferably an expansion engine, or any other suitable device which can expand a fluid in such a manner as to extract internal energy from the fluid, thereby lowering its temperature. To that end, the expander 136 may be any suitable type of expansion engine connected to an outside resistance. In a preferred form of the invention, the secondary compressor 134, the primary or air compressor 2, and the expander 136 are all interconnected, either to the same shaft as shown schematically by the dotted lines 137a and 137b, or are gear connected in any suitable manner to a suitable drive motor for the source of power for the system. Such a drive motor is not shown but will of course be understood by those skilled in the art to be any suitable source of power such as an internal combustion engine, electric motor, or the like.

The compressor 134 has a discharge connection 138 which connects with a suitable filter 140. Filter 140 is connected by way of a conduit 142 to the third reversing valve 38. In the conduit 142 there is provided a variable resistance or orifice 144. The secondary compressor intake is connected with reversing valve 38 by means of conduits 146 and 148. Conduit 146 preferably has therein a variable orifice or resistance 150.

The fourth reversing valve 48 is provided with connections to which the conduits 50 and 52 are connected as aforesaid, and in addition, conduits 152 and 154 are connected with the reversing valve 48. Conduit 154 is connected with another conduit 156, which in turn is connected to two branch conduits 158 and 160. The branch 158 is connected to one end of a fluid passage 162 in heat exchanger 68. The other end of fluid passage 162 is connected to a conduit 164 having therein a combination expansion and shut-off valve 166. Conduit 164 is connected with the lower section 86 of the double column 82 by means of a nitrogen shelf connection 168, the function of which will be explained in the discussion below of the operation.

Branch conduit 160 connects with the expansion engine intake 170. The expansion engine exhaust 172 is connected with a conduit 174, to which in turn are connected two branch conduits 176 and 178. Branch conduits 176 and 178 are provided with shut-off valves 180 and 182 respectively. Branch conduit 178 is connected with one end of a passage 184 in the heat exchanger 68. The other end of passage 184 is connected to the waste gas effluent conduit 36 by way of a conduit 186. Branch conduit 176 is connected to the conduit 152, and, through conduit 152, to the reversing valve 48. A conduit 185, having therein a check valve 186, is connected at its one end to the vapor space above the nitrogen shelf 96 and at its other end into the branch conduit 176 downstream of the valve 180.

Considering now that shell passage 20 forms a first fluid passage, tube passage 46 forms a second fluid passage, tube passage 44 forms a third fluid passage, and shell passage 18 forms a fourth fluid passage, we have now a fifth fluid passage 188, which is the tube passage in the heat exchanger 106, the passage 104 constituting a sixth fluid passage. The fifth passage 188 is connected in parallel with whichever one of the third or second passages, 44 and 46 respectively, happens to be connected for the cooling of compressed gas. The connection of heat exchanger passage 188 in parallel with the third or second passage 44 or 46 is accomplished by a conduit 190 having therein a variable orifice or resistance 192. Accordingly, conduit 190 connects one end of fluid passage 188 with the conduit 142. The other end of fluid passage 188 is connected with conduits 154 and 156 by means of a conduit 194.

If desired, still other fluid passages may be provided for the cooling of the hot compressed gas and for the heating of any excess of cold exhaust gas from the expansion engine as may be left over. To this end, a fluid passage 196 is provided in parallel with the fluid passage 188, by having connected to one end thereof a conduit 198 which connects with conduit 194 and to its other end a conduit 200 which connects with conduit 190. A variable resistance 202 is provided in the conduit 200. A fluid passage 204 in heat exchange relation with fluid passage 196 in a heat exchanger 206 is connected at its one end with conduit 152 by means of a conduit 208 and at its other end with conduits 146 and 148 by means of a conduit 210. A variable resistance 212 is provided in the conduit 210. The passage 196 is preferably the tube passage, and the passage 204 the shell passage, of a shell-and-tube type of heat exchanger.

Variable resistances 192 and 202 will be connected in any suitable manner to close during the first portion of a half-cycle of the reversing heat exchange cycle. In other words, just as the reversing valves 14, 28, 38 and 48 operate, the variable resistances 192 and 202 will be tightened or closed somewhat. At a point approximately midway to three-fifths of the completion of the half-cycle, the variable resistances 192 and 202 will be opened again to a predetermined position. The variable resistances 144, 150, and 212 will be used to secure the desired flow and heat balance among the various fluids involved.

Operation of the variable resistances 192 and 202 as described above may be accomplished in any suitable manner as will be understood by those skilled in the art. Thus the valves 192 and 202 may be controlled by a cam driven by the same shaft that controls the reversing valves 14, 28, 38 and 48.

Reference will now be had to Fig. 3 for a description of the embodiment shown therein. The embodiment shown in Fig. 3 differs from the embodiment shown in Fig. 1 only in that the apparatus shown in Fig. 3 employs a single column whereas the apparatus shown in Fig. 1 employs a double column. Accordingly, whereas in Fig. 1 the compressed air line 76 going to the double column opens into a liquid pot in the lower section of the double column, the corresponding line 76' in Fig. 3 goes instead to one end of a coil 216 in the boiler-condenser 218 located in the bottom of the single column 220. The other end of coil 216 is connected to a conduit 222 which is connected to the upper end of the column at 224. The fluid flowing in the conduit 222 is in thermal contact with the waste gas effluent in a heat exchanger 226. Conduit 222, on the downstream side of heat exchanger 226, is provided with an expansion valve 228. To the waste gas outlet 78', there is secured a waste gas conduit 80', corresponding to the conduit 80 of Fig. 1. Conduit 80' passes through the heat exchanger 226 to provide the aforesaid thermal contact with the air in conduit 222. At a point downstream of heat exchanger 226, conduit 80' is connected to a passage 72' of a heat exchanger 68', which correspond respectively to the passage 72 and the heat exchanger 68 of the Fig. 1 embodiment.

Another difference in the two embodiments lies in the fact that, whereas in the embodiment shown in Fig. 1, the line 164 discharges into the nitrogen shelf of the double column boiler-condenser, in the embodiment shown in Fig. 3 the corresponding line 164' discharges into the air line 76' by way of a valve 166'. Also, whereas in Fig. 1 the line 185 connects through a check valve 186 with the vapor space above the nitrogen shelf, in the embodiment shown in Fig. 3, the make-up line 185' is connected through check valve 186' with the air line 76'.

In other respects, the embodiments shown in Fig. 1 and Fig. 3 will be found to be substantially identical so the remainder of the apparatus shown in Fig. 3 will not be described in detail here.

The method aspects of the invention

For a better understanding of the method aspects of the invention, reference can be had to Fig. 1 which shows apparatus in which the method according to this invention may be practiced. As there shown, raw compressed air passes through a first passage (which is the shell passage 20) in heat exchange with a cold fluid flowing in a second passage (the passage 46 shown in Fig. 1).

As the raw air passes through the first passage referred to in exchange with cold fluid in the second passage, the air is cooled and the condensable impurities, such as the carbon dioxide and the water, are condensed on the cold surfaces of the passage through which the air is flowing, the carbon dioxide condensing of course in the solid state, and the water condensing in both the liquid and the solid states. Air leaving this passage goes to a rectification column for rectification into a substantially pure product and a waste gas effluent. The air could flow directly to the column for the indicated purpose, but in the preferred form of practicing the method aspect of the invention, the air is further cooled prior to rectification by heat exchange with another cold fluid, which is conveniently and preferably the waste gas effluent from the rectification process. Thus the air leaving the first passage referred to is in heat exchange with waste gas effluent in a heat exchanger 68 and passes from this heat exchanger into the column where it is rectified into the pure or substantially pure product, in this case oxygen, and a remaining constituent which comprises a waste gas effluent, mostly nitrogen.

The flow in the passages 20 and 46 takes place over a predetermined time through a predetermined length of half-cycle. This length of half-cycle may conveniently be five minutes, although of course other operating periods may be adopted and may be adapted to different types of apparatus. At the end of the half-cycle referred to, the air and cold fluid are sent through other similar passages, whereupon warm fluid is put through the passage through which cold fluid passed, and waste gas effluent is put through the passage through which air passed. The warm fluid heats the surfaces on which the impurities were condensed during the previous half-cycle and vaporizes them, and the outflowing waste gas carries the impurities out along with it. Thus, in the heat exchanger 16B, the warm gas in the passage 46 heats the surfaces and vaporizes the impurities, and the thus vaporized impurities are swept out of the passage 20 by the leaving waste gas effluent flowing in that passage. At the end of the second half-cycle, fluids flowing in the first and fourth passages exchange passages and the fluids flowing in the second and third passages exchange passages at the same time. In the apparatus shown in the embodiment in Fig. 1, this change is accomplished by means of the reversing valves shown schematically as valves 14, 28, 38 and 48.

In order to accomplish the described rectification at the low temperatures necessary for a gas such as air, refrigeration has to be supplied from a suitable source, which may be any compressor-expander type of refrigerator. Such a suitable source is shown in the compressor-expander circuit indicated schematically in Fig. 1. In the embodiment there shown, the fluid circulated in the compressor-expander circuit tends to be of the same composition as the gas in the vapor space above the nitrogen shelf of the double column, because of the fact that the make-up line 185 for the compressor-expander circuit is connected into the vapor space of the nitrogen shelf.

The fluid flowing in the refrigeration circuit is compressed in the compressor 134 and flows in the aforesaid third passage 44 in heat exchange with a cold fluid flowing in the passage 18. In the course of this heat exchange, the warm fluid in the passage 44 sublimes and vaporizes the previously condensed carbon dioxide and water which are then swept out of the space 18 by the cold outgoing waste gas effluent and are carried out to the atmosphere. The heat exchange referred to as taking place in the aforesaid third and fourth passages, takes place during a half-cycle of operation, at the end of which time, the warm gas exchanges passages with the cold gas in the passage 46. In other words, the warm gas then goes through passage 46 and the cold gas through passage 44.

Warm gas is cooled in the passage 44 and leaves the heat exchanger 16A in a cooled condition, passing thereafter to the expander 136 where it expands with the performance of external work and is lowered in temperature. The cold exhaust gas leaves the expander 136 and is the cold fluid referred to above as passing in heat exchange relation with the ingoing raw air. This cold fluid passes through the passage 46 referred to above and returns in a warm condition to the compressor intake.

Preferably, the flow of the warm gas in its passage in heat exchange with waste gas effluent is varied during the half-cycle of operation in which time it passes through its channel in heat exchange with the waste gas effluent. This channel will be the third or second passage depending upon which one of the passages happens to be connected with the gas compressor discharge. A preferred manner of practicing the invention is to increase the flow of warm fluid in the passage referred to during the first one-half to three-fifths of a half-cycle. Thus, for a five minute half-cycle, the flow of warm gas is greater during the first three minutes of the half-cycle than it is during the remaining two minutes thereof. The object of this increased flow is to warm up the passage (especially the cold end of the passage) through which the warm gas flows. It will be remembered that the outside surface of this passage is the surface upon which the impurities have been condensed out of the air during the previous half-cycle of operation. It is therefore advantageous to increase the temperature of the surfaces during the first portion of the half-cycle of operation, thereafter reducing the quantity of warm gas flowing through the passage in order that the heat exchanger may be returned again to its normal cold temperature in preparation for the next half-cycle.

The phenomenon referred to, which may for convenience be called a temperature drift, is accomplished in the preferred embodiment shown in Fig. 1 by means of a bypass fluid passage connected in parallel with the aforesaid third or second passage, depending upon which one of the passages happens to be connected.

The bypass passage referred to is preferably provided in the form of a fifth fluid passage, disposed in heat exchange (in heat exchanger 106) with cold product returning through a sixth fluid passage. The flow variation referred to during the course of a half-cycle is accomplished by placing a variable resistance or orifice in the fifth fluid passage referred to. The preferred practice involves an increase in the resistance to flow in said fifth fluid passage during the first portion of the half-cycle, in order that increased flow in the third or second passage, whichever happens to be connected, may take place. Thus, a variable resistance 192 is provided in the line 190 which is connected with the passage 188. In the preferred method of practicing the invention, the variable restriction 192 is controlled by the same means which control the interchange of fluid flows in the first and fourth passages and at the same time in the second and third passages.

In the preferred embodiment shown in Fig. 1, still another fluid passage is connected in parallel with the fifth fluid passage referred to, this other fluid passage being the passage 196 (and connected conduits) shown in the apparatus of Fig. 1. It will of course be understood by those skilled in the art, that a resistance 202 similar to the resistance 192 is provided in the conduit 200 connecting with the fluid passage 196, in order that the above-described means of varying fluid flow in the second or third passage as described may be accomplished. The passage 196 referred to is preferably arranged or disposed in a heat exchanger shown as heat exchanger 206, through which fluid flows in heat exchange relation with cold expanded gas from the expander 136, the expanded gas flowing in the passage 204 being the excess over and above the quantity of gas which is required in the second or third fluid passage, depending upon which is connected, for the purpose of cooling the ingoing raw compressed air. In a great many applications, the heat exchanger 206 may be entirely dispensed with, and the only bypass for the warm gas will be the fluid passage 188 referred to above as the fifth fluid passage. Furthermore, in some applications and to a limited extent, the advantages of the invention may be practiced even without the heat exchanger 106 and its passages 188 and 104 referred to.

For a better understanding of the method aspect of the invention (and, for that matter, also the apparatus aspect) a few approximate values may now be provided in the nature of temperatures and pressures for the various portions of the apparatus and circuits.

Air is compressed in the primary compressor 2 to a pressure of 85 p. s. i. g. and thus enters the first fluid passage 20 at said pressure of 85 p. s. i. g. and at a temperature of 310° K.—i. e., atmospheric temperature. Air leaves the passage 20 at a pressure of 82 p. s. i. g. and a temperature of 115° K., entering the passage 70 of heat exchanger 68 in that condition. Air leaves the passage 70 at 80 p. s. i. g. and 103° K., in which state it enters the bottom or lower section of the double column. The air thus entering the rectification column is substantially entirely vapor. Approximately five percent by weight may be liquid at this time, but this will be a very negligible percentage by volume. Oxygen-rich liquid air leaves the lower section of the double column by way of conduit 90 at the aforesaid 80 p. s. i. g. and at 102° K., passing to the heat exchanger 98. The oxygen-rich liquid air leaves heat exchanger 98 at the 80 p. s. i. g. referred to above and at 90° K., and is expanded in the expansion valve 92, going into the upper section of the double column at approximately 7 p. s. i. g. Waste gas effluent leaves the column by way of conduit 80 at 7 p. s. i. g. and 82° K., entering the heat exchanger 68. Waste gas effluent leaves the heat exchanger 68 at 5 p. s. i. g. and at 106° K., entering the reversing heat exchanger in that state. Waste gas effluent leaves the reversing heat exchanger at substantially atmospheric pressure and atmospheric temperature, or approximately 307° K.

Oxygen product leaves the column by way of the connection 100 and conduit 102 at 7 p. s. i. g. and 95° K., and leaves the heat exchanger 106 at substantially atmospheric pressure and 307° K. Nitrogen leaves the nitrogen shelf by way of conduit 94 at 80 p. s. i. g. and 97.5° K., entering the heat exchanger 98 after expanding to 10 p. s. i. g., and thus entering heat exchanger 98 at 10 p. s. i. g. and 83° K. Nitrogen-rich liquid and vapor leaves the heat exchanger 98 at 7 p. s. i. g. and 82° K. and enters the top of the column.

Gas is compressed in the secondary compressor to a pressure ranging from 160 p. s. i. g. to 200 p. s. i. g., and enters the third fluid passage referred to above at the pressure indicated and at atmospheric temperature. The refrigerant gas leaves said passage at 125° K. and at 199 p. s. i. g. (assuming an initial high pressure of 200 p. s. i. g.). The cooled compressed gas passes to the expander 136 and leaves the expander at 80 p. s. i. g. and 100° K., entering the second fluid passage 46 in that state. The expanded gas leaves the passage 46 at 75 p. s. i. g. and 305° K. and enters the secondary compressor intake in that condition.

It will of course be understood that the temperatures and pressures of the parallel passages 188 and 196 will correspond to the temperatures and pressures in the corresponding connected second or third passage.

At this time the method aspect of the invention involving temperature drift will be discussed. During the first three-fifths of a half-cycle, the resistance to flow through valves 192 and 202 is automatically increased, necessitating an increased flow of warm gas through the third or second passage, whichever is connected to receive compressor discharge. In the position of the valves shown, the third passage is thus connected, so that this discussion will refer to flow through the third passage.

Valves 192 and 202 could of course be closed entirely for the portion of a half-cycle referred to. However, this might result in too great a loss in refrigeration in heat exchanger 106, and in too wide temperature fluctuations, so a more practical approach would be to reduce the flow of warm gas in passage 188 to a fraction of its normal or unrestricted flow—say two-thirds or one-half.

The resulting increase in the flow of warm gas through the third passage causes the temperature of reversing heat exchanger 16A to begin to rise during the half-cycle in which warm gas passes through its tube passage or passages. This temperature drift continues until valves 192 and 202 are returned to normal at the end of the three-minute period, whereupon the temperature begins to settle again to what it would be without the temporary restriction. In mathematical terms, the operation may be described by stating that the flow ratio $$\frac{\text{Third or second passage}}{\text{Fifth passage}}$$

varies during the time period for which the third or second passage is connected to receive warm, compressed fluid, that time period being a half-cycle in the embodiment shown.

In addition to the drift referred to, there is an incidental temperature drift caused by the fact that the quantity of fluid circulated in the compressor-expander circuit is slightly more than the minimum required to effect the necessary cooling of raw air to accomplish substantially complete deposition of carbon-dioxide. This slight excess of compressed refrigerant fluid will bring about a downward drift (lowering) of the temperature of a reversing heat exchanger when it is receiving cold expanded fluid, and upward when it is receiving warm compressed fluid.

The temperature drift (of both types) referred to aids in the removal of impurities, especially the carbon-dioxide. To begin with, the downward drift gradually shifts the location of the zone of lowest temperature, and therefore of course also effects a gradual and continuous shift along the outside of the tubes of the carbon-dioxide deposition zone. The result is a more effective removal of impurities from the air.

The upward drift of temperature operates of course in the reverse manner, bringing about a gradual shift along the tube surfaces of the maximum temperature, resulting in a more effective removal of impurites from the reversing heat exchanger.

Operation

Although the operation of the apparatus shown in the drawings will probably be reasonably well understood by those skilled in the art from the foregoing detailed description, some discussion of the operation of the apparatus aspects of the invention will be set forth here, especially a description of the operation for cooling down the apparatus from room temperature to operating temperatures. To prepare the apparatus for starting, the operator opens valves 112, 166 and 182 and closes valves 114 and 180. During the cool-down period, the valve 166 operates as an expansion valve.

Air enters the primary compressor by way of the intake 4 and is compressed, passing through reversing valve 14 to the first passage 20 of heat exchanger 16B. The air leaves the passage 20 and heat exchanger 16B by way of reversing valve 28, passing to the passage 70 in heat exchanger 68, and thence going to the column by way of conduit 76.

In the column, air flows to the upper section 88 of the column by way of conduits 90 and 94. At the same time, however, air also leaves the lower section of the column by way of conduit 185 and check valve 186. This air goes to the line 176 which is connected with the secondary compressor intake by way of fluid passages 46 and 204. Air thus enters the secondary compressor and is compressed, leaving the compressor 134 by way of conduits 138 and 142. A portion of the air passes to the reversing valve 38 and from there through heat exchanger 16A, namely passage 44 thereof, leaving the heat exchanger 16A by way of conduit 50 and going to reversing valve 48, which it leaves by way of the conduit 154. Meanwhile, the remainder of the air from the secondary compressor passes by way of conduits 190 and 200 through passages 188 and 196 respectively and rejoins the air from the passage 44 in the conduit 156, passing to the expander 136 by way of conduit 160. Air enters the expander by way of the intake 170 and is expanded therein at the expense of its internal energy, leaving the expansion engine by way of exhaust 172 at a reduced temperature.

The cold exhaust passes to conduits 174 and 178, thence to passage 184 in heat exchanger 68, and from there to the conduit 36 and reversing valve 28. Thence the exhaust, now partially warmed by heat exchange in the heat exchanger 68 with ingoing air, leaves the reversing valve 28 and passes to the passage 18 of heat exchanger 16A by way of conduit 30. It will be understood that the expansion engine exhaust joins the air leaving the column by way of the effluent conduit 80 and passage 72. The air from the effluent or waste gas outlet 78 of the column and the expansion engine exhaust pass through passage 18 of heat exchanger 16A in heat exchange with the secondary compressor discharge air, and leave the system by way of the discharge conduit 26 and reversing valve 14.

Simultaneously, air is flowing in the passages of heat exchangers 206 and 106, leaving the product line 108 by way of valve 112 and conduit 110.

The heat exchange in heat exchanger 16A (or 16B depending upon the position of the reversing valves) between the expansion engine exhaust and the compressor discharge, results in regenerative cooling, which eventually brings the air temperature down low enough so that liquefaction of the air begins to take place in heat exchanger 68. Liquid gradually begins to build up in the lower section of the column, and is carried to the upper section of the column. The operator watches the liquid accumulation in the oxygen pot 122, and when the liquid level has reached a predetermined desired point, the operator opens valves 114 and 180 and completely closes valves 112, 166 and 182. The apparatus is thereupon ready to produce substantially pure oxygen product.

It will of course be understood by those skilled in the art that, at the very outset, the fluid flowing in the compressor-expander circuit comprising the secondary compressor 134 and the expander 136 is air. However, as the system gradually cools down and enters the normal operating phase, the composition of the fluid flowing in the compressor-expander circuit will gradually change until it is substantially nitrogen, inasmuch as the make-up connection for the compressor-expander circuit is directly to the vapor space above the nitrogen shelf in the evaporator-condenser in the double column. In the apparatus shown in Fig. 3, the make-up gas connection 185' is to the compressed air line 76', so the refrigerant fluid tends to be air, possibly enriched somewhat in nitrogen because of some liquefaction in heat exchanger 68', the liquid there forming being rich in oxygen.

Operation of the apparatus after cool-down is completed will be well understood by those skilled in the art from what has already been set forth, and any further discussion of the operation would merely result in unnecessary repetition.

A brief description of the operation of the refrigeration waster is in order, because under certain conditions the use of a refrigerator waster may be desirable. This feature of the apparatus is particularly useful when separating air having impurities which are not satisfactorily removed in a heat exchanger.

The refrigeration waster serves the purpose of a continuously operating purge line, because some of the liquid product containing impurities is being removed all the time. Inasmuch as the constant boiling of the liquid product tends to carry solid impurities to the top, a continuous removal of a small percentage of liquid from the surface prevents the concentration of impurities in the boiler-condenser. The liquid product containing impurities is thus drained off and vaporized in the refrigeration waster. The product itself is not lost because the refrigeration waster discharges into the product line 108 by way of conduit 124.

The quantity of liquid thus drawn off may vary, but will ordinarily not exceed five or six percent. Flow through the refrigeration waster is controlled by the valve 126, which in turn is controlled by the pressure drop from bottom to top of the column (Fig. 3), or of the low pressure section of the column (Fig. 1).

It will be seen from the foregoing that I have here provided apparatus and a method for the separation of gases which effectively removes impurities from the mixture prior to its rectification, and which discharges the impurities to atmosphere effectively and prevents the accumulation thereof in the apparatus.

While this application specifically describes apparatus and a method for practicing the invention, it will be understood that these are set forth for purposes of illustration, and that the invention may be modified and practiced in other ways without departing from its spirit or the scope of the invention.

I claim:

1. In an air separation system having a source of compressed air, a rectification column having an air inlet and a waste gas outlet, a source of refrigeration, and a waste gas discharge, the improvement comprising: a pair of reversing heat exchangers, each of which has a fluid passage comprising at least one tube and a different fluid passage comprising a shell surrounding said at least one tube, means to pass air from said air source through the shell passage of one of the reversing heat exchangers to the column air inlet, means to pass a cold fluid through the tube passage of said one of the reversing heat exchangers whereby condensable impurities are deposited out of the air onto surfaces disposed in the shell passage of said one of the reversing heat exchangers, means to pass column waste gas from the column waste gas outlet through the shell passage of the other one of the reversing heat exchangers to the waste gas discharge, means to pass a warm fluid through the tube passage of said other one of the reversing heat exchangers whereby previously condensed impurities are removed from surfaces of said other one of the reversing heat exchangers and are carried out through the waste gas discharge, means, including all of said passing means, periodically to interchange the passages through which the air and column waste gas flow and at the same time to interchange the passages through which the cold and warm fluids flow, and means to vary the rate of warm fluid flow between such periodical interchanges.

2. An air separation system as in claim 1, in which the means to vary the flow rate includes another heat exchanger having a fluid passage connected in parallel with the tube passage of said other one of the reversing heat exchangers.

3. An air separation system as in claim 2, in which the means to vary the flow rate also includes a variable resistance in said parallel fluid passage.

4. An air separation system as in claim 3, in which the column waste gas passing means includes a heater for the waste gas.

5. An air separation system as in claim 4, in which the waste gas heater is a heat exchanger having a fluid passage for said waste gas and another fluid passage for air, whereby air leaving the reversing heat exchanger is further cooled before entering the column air inlet.

6. In an air separation system having an air compressor, a rectification column having an air inlet and a waste gas outlet, a source of refrigeration including an expansion engine having inlet and exhaust connections and connected to supply at least some of the power to drive the air compressor, and a waste gas discharge, the improvement comprising: a pair of reversing heat-exchangers, each of which has a fluid passage comprising at least one tube and a different fluid passage comprising a shell surrounding said at least one tube, means to pass air from said air source through the shell passage of one of the reversing heat exchangers to the column air inlet, means to pass a cold fluid through the tube passage of said one of the reversing heat exchangers whereby condensable impurities are deposited out of the air onto surfaces disposed in the shell passage of said one of the reversing heat exchangers, means to pass column waste gas from the column waste gas outlet through the shell passage of the other one of the reversing heat exchangers to the waste gas discharge, means to pass a warm fluid through the tube passage of said other one of the reversing heat exchangers whereby previously condensed impurities are removed from surfaces of said other one of the reversing heat exchangers and are carried out through the waste gas discharge, and means, including all of said passing means, periodically to interchange the passages through which the air and column waste gas flow and at the same time to interchange the passages through which the cold and warm fluids flow.

7. An air separation system as in claim 6, in which the means to pass cold fluid includes the expansion engine exhaust connection, whereby said cold fluid at least includes said expansion engine exhaust.

8. An air separation system at in claim 7, in which the refrigeration source also includes a compressor connected to discharge to the tube passage of said other one of the reversing heat exchangers whereby the fluid discharged by the compressor comprises said warm fluid.

9. In a gaseous mixture separation system having a source of compressed mixture, a rectification column having a mixture inlet and a waste gas outlet, a gas compressor having an inlet and a discharge, a source of refrigeration having a warm gas connection and a cold gas connection, and a waste gas discharge, the improvement comprising: a pair of reversing heat exchangers of the shell-and-tube type, each of said reversing heat exchangers having a two-ended fluid passage comprising at least one tube and a different two-ended fluid passage comprising a shell surrounding said at least one tube, means including conduits and a first reversing valve alternately to connect said mixture source to one end of the shell passages of the reversing heat exchangers, means including conduits and a second reversing valve to connect said mixture inlet with the other end of that one of the shell passages of the reversing heat exchangers through which mixture is passing, means including conduits and a third reversing valve alternately to connect the gas compressor discharge with one end of the tube passages of the reversing heat exchangers, means including conduits and a fourth reversing valve to connect said warm gas connection with the other end of that one of the tube passages of the reversing heat exchangers which is connected with the gas compressor discharge, means including conduits and the fourth reversing valve to connect the cold gas connection with one end of that one of the tube passages which is not receiving gas from the gas compressor, means including conduits and the third reversing valve to connect the gas compressor intake with the other end of that one of the tube passages which is connected with the cold gas connection, means including conduits and the second reversing valve to connect the column waste gas outlet with one end of that one of the shell passages which is not receiving mixture, means including conduits and the first reversing valve to connect the waste gas discharge with the other end of that shell passage which is receiving waste gas from the column, and means to reverse the reversing valves periodically and in unison.

10. A separation system as in claim 9, and another heat exchanger having a two-ended fluid passage connected at one end with the gas compressor discharge and at the other end with said warm gas connection.

11. A separation system as in claim 10, in which the connection between the gas compressor discharge and said another heat exchanger includes a variable orifice.

12. In a gaseous mixture separation system having a source of compressed mixture a rectification column having a mixture inlet, a product outlet, and a waste gas outlet; a source of refrigeration and a waste gas discharge; the improvement comprising: a pair of reversing heat exchangers, each of which has a fluid passage comprising at least one tube, and a different fluid passage comprising a shell surrounding said at least one tube; means to pass mixture from said mixture source through the shell passage of one of the reversing heat exchangers to the column mixture inlet; means to pass a cold fluid through the tube passage of said one of the reversing heat exchangers whereby condensable impurities are deposited out of the mixture onto the surfaces disposed in the shell passage of said one of the reversing heat exchangers; means to pass column waste gas from the column waste gas outlet through the shell passage of the other one of the reversing heat exchangers to the waste gas discharge; means to pass a warm fluid through the tube passage of said other one of said reversing heat exchangers whereby previously condensed impurities are removed from the surface of said other one of the reversing heat exchangers and are carried out though the waste gas passage; means, including all of the aforesaid passing means, periodically to interchange the passages through which the mixture and the column waste gas flow and at the same time to interchange the passages through which the cold and warm fluids flow; another heat exchanger having two fluid passages; means to connect one of the fluid passages of said another heat exchanger in parallel with the tube passage of said other one of said reversing heat exchangers; and means to connect the product outlet to the other fluid passage of said another heat exchanger.

13. In a gaseous mixture separation system having a source of compressed mixture; a rectification column having a mixture inlet, a product outlet, and a waste gas outlet; a source of refrigeration; and a waste gas discharge; the improvement comprising: a pair of reversing heat exchangers, each of which has a fluid passage comprising at least one tube, and a different fluid passage comprising a shell surrounding said at least one tube; means to pass mixture from said mixture source through the shell passage of one of the reversing heat exchangers to the column mixture inlet; means to pass a cold fluid through the tube passage of said one of the reversing heat exchangers whereby condensable impurities are deposited out of the mixture onto the surfaces disposed in the shell passage of said one of the reversing heat exchangers; means to pass column waste gas from the column waste gas outlet through the shell passage of the other one of the reversing heat exchangers to the waste gas discharge; means to pass a warm fluid through the tube passage of said other one of said reversing heat exchangers whereby previously condensed impurities are removed from the surface of said other one of the reversing heat exchangers and are carried out through the waste gas passage; means, including all of the aforesaid passing means, periodically to interchange the passages through which the mixture and the column waste gas flow and at the same time to interchange the passages through which the cold and warm fluids flow; another heat exchanger having two fluid passages; means, including a variable flow device, to connect one of the fluid passages of said another heat exchanger in parallel with the tube passage of said other one of said reversing heat exchangers; and means to connect the product outlet to the other fluid passage of said another heat exchanger.

14. A method for the separation of a gaseous mixture by rectification into its constituents to produce a substantially pure product and a waste gas effluent, comprising expanding a fluid with the performance of external work to produce a cold exhaust fluid, cooling the mixture in a first passage by heat exchange with said cold fluid flowing through a second passage to effect the removal from the mixture of condensable impurities, rectifying the mixture as aforesaid, compressing the fluid after said heat exchange with the mixture, cooling at least some of the compressed fluid in a third passage by heat exchange with the waste gas effluent flowing through a fourth passage, whereby the compressed fluid vaporizes previously condensed impurities and the waste gas effluent carries the impurities out, thereafter expanding the fluid as aforesaid, and periodically interchanging the flows in the first and fourth passages and at the same time interchanging the flows in the second and third passages.

15. A method as in claim 14, in which compressed fluid is also cooled in a fifth passage by heat exchange with cold product flowing in a sixth passage.

16. A method as in claim 15, in which the cooling in the fifth passage is effected simultaneously with the cooling of the compressed fluid in the third or second passage according to which one is connected, and in which the flow ratio $$\frac{\text{Third or second passage}}{\text{Fifth passage}}$$

varies during the time period for which said third or second passage is connected to receive compressed fluid.

17. A method as in claim 16, in which said ratio is greater at the beginning of said period than at the end thereof.

18. A method as in claim 17, in which compressed fluid is also cooled by heat exchange with cold fluid at the same time that the other cooling of the compressed fluid takes place.

19. A method as in claim 18, in which, after said heat exchange in a first passage, the mixture is further cooled by heat exchange with the waste gas effluent, which further cooling of the mixture preheats said effluent prior to its heat exchange with compressed fluid.

20. A method as in claim 14, in which compressed fluid is also cooled by heat exchange with cold fluid at the same time that the other cooling of the compressed fluid takes place.

21. A method as in claim 14, in which, after said heat exchange in a first passage, the mixture is further cooled by heat exchange with the waste gas effluent, which further cooling of the mixture preheats said effluent prior to its heat exchange with compressed fluid.

SAMUEL C. COLLINS.

References Cited in the file of this patent

UNITED STATES PATENTS

| Number | Name | Date |
|---|---|---|
| 1,842,263 | Gobert | Jan. 19, 1932 |
| 2,526,996 | Crawford | Oct. 24, 1950 |
| 2,534,478 | Roberts | Dec. 19, 1950 |
| 2,584,381 | Dodge | Feb. 5, 1952 |